United States Patent Office 2,866,333
Patented Dec. 30, 1958

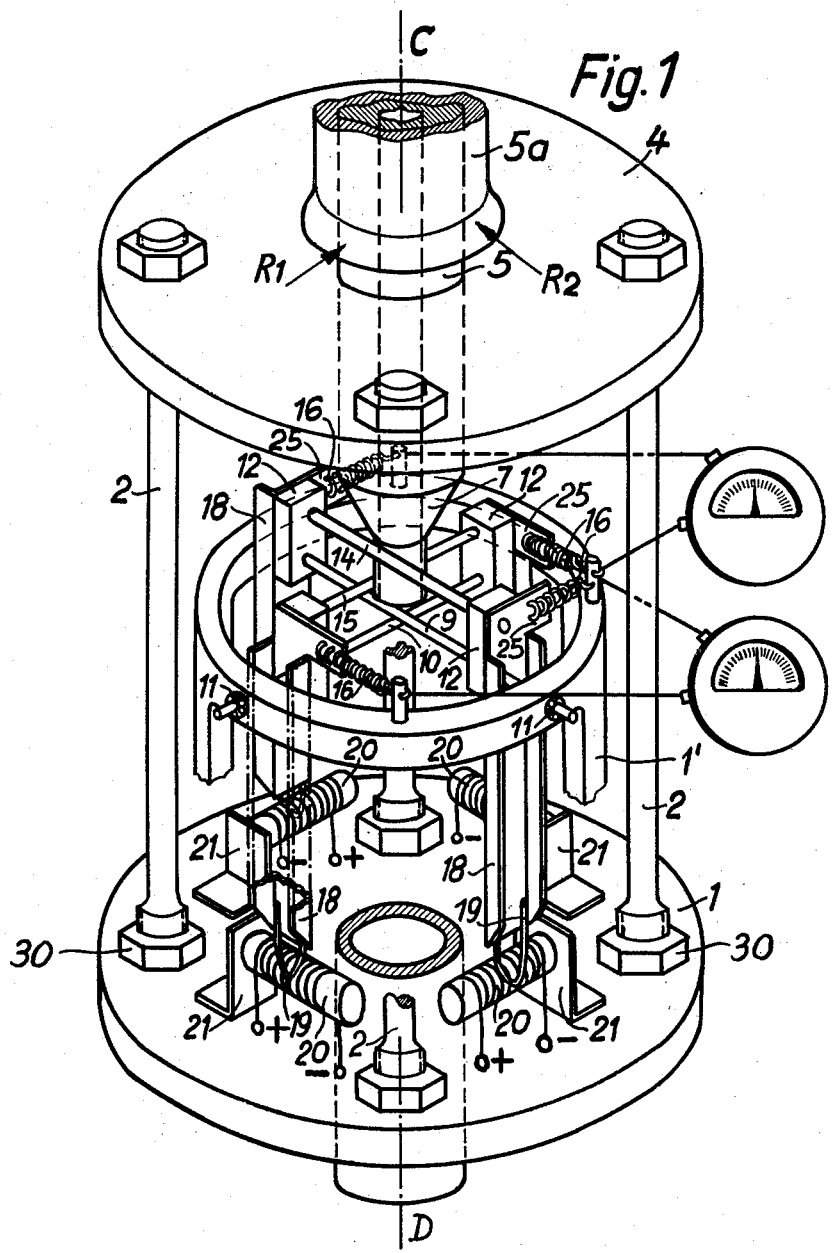
INVENTOR
Hans Jurgen Dudenhausen

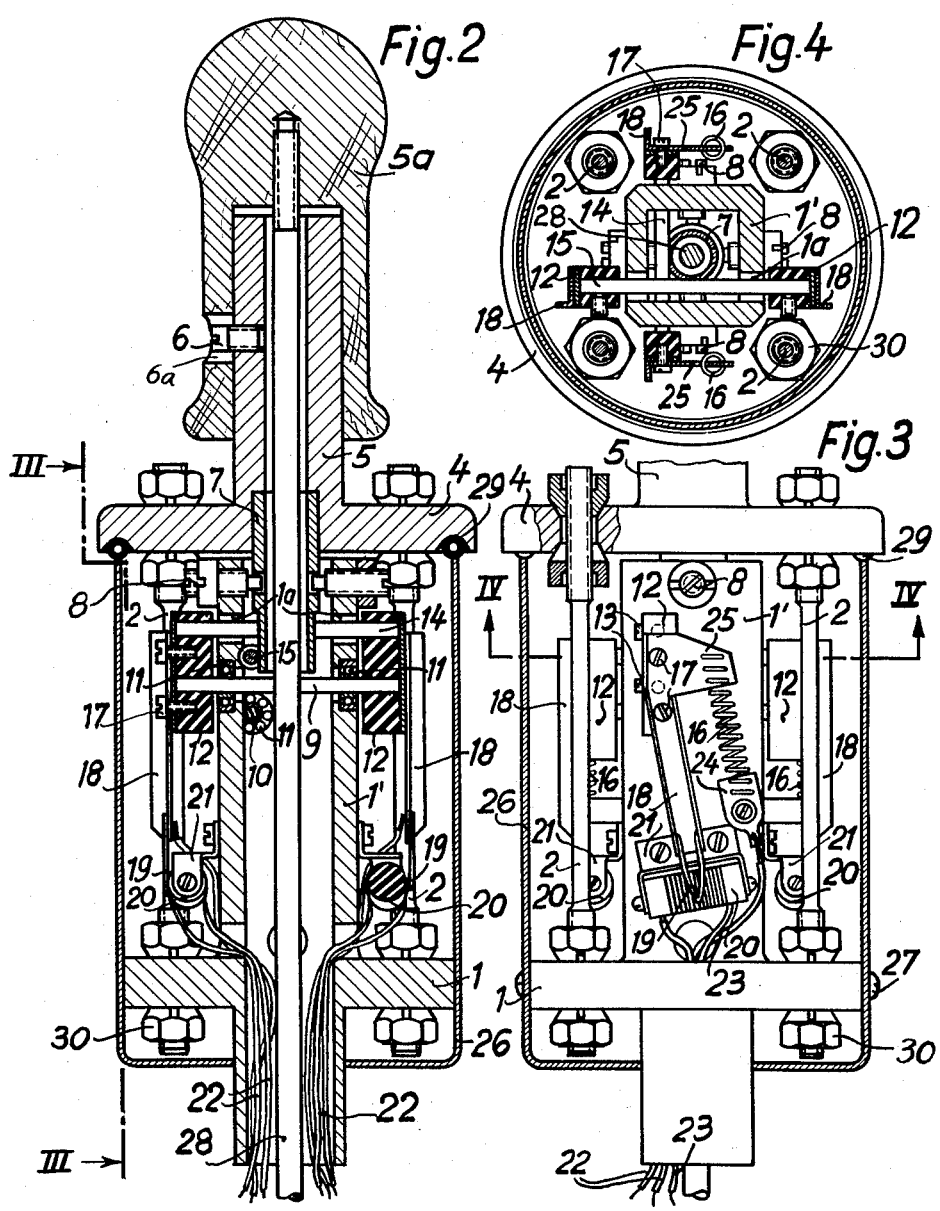

2,866,333

PLURAL AXIS DYNAMOMETER

Hans Jurgen Dudenhausen, Stuttgart, Germany, assignor to Intavex, Inc., New York, N. Y., a corporation of New York Application April 4, 1956, Serial No. 576,198

6 Claims. (Cl. 73—141)

Dynamometers have already been proposed for measurements in two planes. These devices resolve forces operating in a single plane into separate components and produce therefrom signals representative according to magnitude and direction of the components of the original stress. These known dynamometers are constructed in two superposed planes or systems with a separate measurement apparatus for each axis of measurement.

The great disadvantage of these dynamometers is the complexity of their construction. The arrangement of their elements produces substantial bulk and complicates the servicing thereof. Moreover there is an undesired interaction between the two axes.

The present invention has for an object the provision of a plural axis dynamometer in which the operation in each axis is independent of the others. This is achieved by the provision of a single system of springs or resilient elements for measurement in two axes. This makes possible such an arrangement of all elements of the dynamometer that all portions thereof are easily accessible and provides a plural axis dynamometer which is simple in construction and easy to maintain. Upon removal of a cover or housing all of the elements of the dynamometer are readily accessible from all sides.

Moreover the dynamometer of the present invention is constructed according to the bulding block principle. Thus all the elements are so shaped and arranged that without constructional changes and simply by fastening on the additional necessary parts, a two-axis dynamometer can be transformed into a three-axis dynamometer.

The dynamometer of the invention provides control signals which in magnitude and polarity are proportional to the stress and the direction of stress applied thereto, e. g. to a hand grip coupled to the dynamometer. With such a dynamometer it is for example possible to control the three drives of a traveling crane by means of a single hand grip or lever, with respect both to velocities and directions of motion or rotation. The control of such machines by means of push buttons or levers heretofore employed has required much skill and effort from the operating personnel. Moreover, the present dynamometer can be employed wherever motions are to be controlled from a single control.

According to the invention, a fixed frame is connected via resilient elements with a movable structure to which the stresses to be measured are applied. The motions or deformations of the movable structure are transmitted, by mechanical elements fastened thereto, to mechanical transmission devices in the fixed frame, these transmission devices being operative along the axes of the components into which the stresses applied to the movable structure are to be resolved. With each of the transmission devices there is associated a slide wire contact to which is coupled the strain-motion in one coordinate, the slide wire contact being associated with a generator of electrical signals such as a potentiometer, the arrangement being such as to generate signals representative in magnitude and polarity of the resolved components of the applied stress.

According to one embodiment of the invention, the fixed frame is connected by means of four cantilever-type springs to a plate supporting the hand grip or other device to which the stresses to be measured are applied. Two rods perpendicular to each other are continually stressed by the springs against a tube which is fixed to the hand grip supporting plate. Each rod is rotatable about an axis parallel to itself in the frame, so that the rods follow motions of the tube parallel to itself. According to a further feature of the invention, the rods, which are continually coupled to the tube by the stress of the springs, are borne each in two blocks which are rotatable about the axes of rotation of the rods and execute with the rods all the motions thereof. Each rod is borne in two blocks, one at each end of the rod. The two blocks of each rod are coupled to the frame by light springs, such as coil springs, which stress the rods against the tube of the hand grip plate. Lever arms are arranged on the blocks which therefore execute the motions of the rods and of the blocks coupled thereto. These arms carry each a sliding contact. Each such contact travels over an electrical resistance arranged in the frame, for example as a potentiometer, to develop on the contact a voltage corresponding to the deflections executed by the rods. The contacts and arms are insulated with respect to the members which support them, but they are electrically connected via the coil springs with a suitable electrical device, such as a voltmeter.

It is a further feature of the invention that the two-axis potentiometer is arranged for the simple attachment thereto of the components of a third dynamometer for measurment of stresses in the third dimension. To this end the frame is apertured not only to accommodate the cables for the connections to the potentiometers already mentioned but also to accommodate certain structural elements of a third dynamometer. To this end likewise, an upper plate and its central tube are also centrally apertured. For connection of the third dynamometer, it is necessary only to screw into the hand grip a coupling rod to the lower end of which the third dynamometer is connected, advantageously for example a dynamometer of ring shape. This dynamometer effects transformation into electrical signals of stresses applied vertically.

The advantageous construction of the apparatus of the invention employs a symmetrical arrangement of the frame with respect to the upper plate, which is connected to the frame by four springs, and also a symmetrical arrangement of the mechanical and electrical motion and signal transmitting elements disposed between the frame and upper plate. This achieves the advantage that a housing or cover can be slipped over the frame and simply fastened thereto with screws. Upon removal of the housing all the elements of the apparatus are readily accessible.

With a uniform cross-section of the springs the stress-strain characteristic of all is equal. With this construction, therefore, a given stress in the plane of measurement effects the same lateral displacement of the upper plate irrespective of the direction of the applied stress. In order to give the dynamometer a different stress-strain characteristic in a selected direction, the moment of inertia of the springs can be altered by the selection of a different or non-uniform cross-section therefor. Thus, the springs may be provided with rectangular or elliptical sections.

Further characteristics of the invention will now be explained with reference to the accompanying drawings, in which—

Fig. 1 is a schematic perspective representation of a plural axis dynamometer according to the invention;

Fig. 2 is a vertical section through a complete dynamometer according to the invention;

Fig. 3 is a section taken on the line III—III of Fig. 2; and

Fig. 4 is a section taken on the line IV—IV of Fig. 3.

Referring to Fig. 1, a fixed base frame 1 has fastened thereto four cantilever-type springs 2 of equal length. The frame 1 constitutes a base for the dynamometer to be fixed in the frame of reference with respect to which stresses are to be analyzed and measured. The springs 2 are, according to the invention, preferably fastened to frame 1 with nuts having split-cone ends in order to be self-centering in holes in the frame 1. The springs 2 are fastened to frame 1 at the corners of a rectangle surrounding the hollow column 1', which is affixed to and forms an extension from the frame 1 the springs extending therefrom parallel to each other. The opposite ends of the springs are similarly fastened to a stress-receiving member in the form of an upper plate 4 arranged parallel to the frame 1. A hand grip 5a is fastened to the plate 4 over a stem 5. The screw 6 (Fig. 2) limits upward and downward motion of the hand grip. Advantageously however an enlarged opening 6a about screw 6 permits limited up-and-down motion of grip 5a, if a third dynamometer element is provided for measurement of stresses having vertical components.

If a stress is applied to the hand grip perpendicular to its axis C—D (Fig. 1), the plate 4 will be displaced in the direction of the applied stress in view of the elasticity of the springs 2, and this displacement of the plate 4 will be parallel to the frame 1. The extent of displacement is proportional to the stress applied to the hand grip—assuming, of course, a stress within the elastic limit of the springs 2.

A tube 7 is fastened to and depends from the under side of the plate 4. This tube is in spaced telescoping relation with column 1'. Limit screws 8 threaded into column 1' limit the displacement of plate 4 under applied stress. This maximum displacement can be set, for example, at a few tenths of a millimeter. The screws 8 also limit the rotational motion of plate 4 which can be imposed thereon by means of a rotational moment applied about the axis C—D. The screws are thus provided to prevent overloading of the springs 2. To prevent excessive rotation, the screws 8 are provided with reduced ends which fit with specified clearance into corresponding holes in the tube 7 which is fixed to the plate 4. Tube 7 consequently is permitted to execute limited rotational motions above the frame 1 when the direction of the stress applied to the grip 5a is rotationally shifted about the axis C—D, the diameter of this circular motion being proportional to the applied stress.

In the frame extension column 1' two shafts 9 and 10 are arranged for rotation about perpendicular axes in anti-friction bearings 11. Outside of column 1', as indicated in Fig. 4, blocks 12 are fastened with screws 13 to the ends of shafts 9 and 10 for rotation with these shafts. Rods 14 and 15, arranged above and respectively parallel to shafts 9 and 10, are affixed to the pair of blocks 12 affixed to the shafts 9 and 10 to which they are respectively parallel. The four blocks 12 can execute oscillatory pendulum motions in pairs about axes of rotation defined by shafts 9 and 10, the magnitude of which motions is limited by engagement of rods 14 and 15 with the walls of openings 1a in the vertical column 1', as indicated in Figs. 2 and 4. An arm 18 is fastened to each block 12. There is thus provided a pair of arms 18 preferably parallel to each other, which executes with rod 14 the same angular motions about an axis defined by shaft 9, and a second pair of arms, preferably also parallel to each other, which executes with rod 15 the same angular motions defined by shaft 10.

The rod 14 with its associated blocks 12 and shaft 9 is seen to constitute a crank journaled in column 1', rod 14 being the crankpin, shaft 9 the crankshaft and the attached blocks 12 being webs. Rod 15 with its associated blocks 12 and shaft 10 constitutes a similar crank. The location of the bearings 11 for shafts 9 and 10 is such that for an unstressed condition of the dynamometer the plane defined for each of these cranks by its crankshaft and crankpin is parallel to the length of springs 2 and of tube 7 against which the crankpins are stressed by coil springs 16. Consequently motions of tube 7 transverse to its own length will be at right angles to the webs of the cranks just described, and will possess maximum effectiveness in producing angular motion of the cranks.

While the two arms 18 affixed to rod 14 must be rigidly fastened together in order that they may execute the same angular motion around their axis of rotation defined by shaft 9, and similarly in the case of the angular motion of the arms 18 affixed to rod 15 about the axis of rotation defined by shaft 10, it is unnecessary to the invention that shafts 9 and 10 be fastened to the pairs of blocks 12 to rotate therewith. Hence the combination of rod 14 and shaft 9 with a pair of blocks 12 and the combination of rod 15 and shaft 10 with blocks 12 need not constitute cranks in the sense that the crankshafts of these cranks need not execute the angular motions of their crankpins. Alternatively the pairs of parallel arms 18 may be regarded as levers rigidly coupled together to rotate about axes defined for one pair of arms 18 by shaft 9 and for the other pair by shaft 10. Plates 25 fastened one to each of the blocks 12 permit coupling of the blocks with coil springs 16 which connect with frame 1 via plates 24 and which hold the rods 14 and 15 against the tube 7.

If now a stress is applied to the grip 5a, for example in a direction parallel to the length of rod 15 (indicated by the arrow $R_1$ in Fig. 1), then the plate 4 and with it tube 7 will move parallel to the shaft 15 through a distance proportional to the applied stress. Since one pair of the springs 16 continuously stresses the rod 14 against the tube 7, rod 14 will, in rotation about its axis of rotation formed by shaft 9, follow the motion of tube 7. If the applied stress is opposite to the arrow $R_1$ the same process takes place but in the reverse direction, the tube 7 rotating the rod 14 about shaft 9 in the opposite sense. With the applied stresses just assumed, the shaft 10 and rod 15 and their associated blocks 12 are stationary since shaft 10 and rod 15 are perpendicular to shafts 9 and rod 14.

If a stress is applied to the grip 5a in the direction parallel to the arrow $R_2$, i. e. parallel to rod 14 and shaft 9, grip 5a with its stem 5 and the plate 4 with its tube 7 will be displaced parallel to the rod 14. The tube 7 carries rod 15 with it in its motion so that the rod 15 is rotated about shaft 10. For an opposite direction of applied stress the directions of motion are reversed, the shaft 9 and rod 14 again remaining stationary.

If a stress is applied to grip 5a in a direction which lies in the plane of arrows $R_1$, and $R_2$ but at an inclination to the rods 14 and 15, rotations will be imposed upon both of rods 14 and 15, through angles corresponding to the components of the applied stress parallel to the rods 14 and 15.

With the dynamometer of the invention as thus far described, it is possible to transpose stresses applied to the hand grip in one plane to mechanical elements in the form of motions proportional in magnitude and direction to these components. These mechanical elements are in the example illustrated the blocks 12 and pairs of arms 18 which execute corresponding rotational motions about their axes of rotation in shafts 9 and 10. Since the dynamometer of the invention is intended to develop for control purposes electrical impulses proportional in magnitude and polarity to the applied stresses, additional means in the form of transducers are provided to transform the mechanical motions of blocks 12 into proportional electrical signals.

According to the invention, there are to this end provided arms 18 which are fastened with screws 17 to the blocks 12, the arms being insulated from the elements of structure already described except springs 16. This insulation may, for example, be achieved by making the blocks of insulating material. Arms 18 carry contacts shown in the example illustrated as V-shaped slider wires 19. The four arms 18 thus execute in pairs the same motions as the blocks so that the contacts 19 move over electrical resistances 20 in corresponding fashion, one for each of the four arms 18. Resistances 20 comprise cylindrical insulating bodies, for example metallic cylinders having a thin anodized layer thereon, on which is wound a coil of resistance wire. The ends of the resistances 20 are, as shown in Fig. 1, connected in oppositely selected pairs via conductors of cable 22 to the positive and negative terminals of a source of direct current voltage, so that of the two resistances engaged by the two sliders 19 fixed to each of rods 14 and 15, the end of one resistance corresponding to one extreme of motion by the rod to which it is coupled is connected to the positive terminal of the source whereas the similarly located end of the other resistance is connected to the negative terminal. Resistances 20 are fastened with brackets 21 to the frame 1.

Each pair of arms 18 therefore picks off a voltage difference from the associated pair of resistances 20. This voltage is conducted out via the two springs connected to the rod 14 or 15 to which the pair of arms 18 in question is affixed, and thence via conductors 23 to an indicating instrument or the like. The voltage differences so picked off are individually proportional to the instantaneous positions of the two pairs of slider contacts 19 on resistances 20. In the drawings the dynamometer is shown in neutral or unstressed position with contacts 19 at the midpoints of resistances 20, for which the voltage differences picked off are zero. Since the contacts are fastened to arms 18 which are insulatedly supported on blocks 12, the positions of the contacts are representative of the instantaneous positions of the blocks 12. Since the deviations of the blocks from the neutral position shown in Fig. 1 are in magnitude and direction dependent on the stresses applied to plate 4, the contacts 19 provide potentials representative of the magnitude and direction of the components of the stress applied to the plate 4.

The electrical connection of resistances 20 and the method in which voltages are picked off therefrom by the contacts 19 is clearly shown in the schematic drawing of Fig. 1. The voltages can, for example, be applied to voltmeters having crossed coils, these voltmeters being calibrated directly in pounds or other units of stress. Of course, however, the voltages can be otherwise employed, for example in Ward-Leonard controls for the operation of the drives of a traveling crane or in Wheatstone bridges, relays and the like.

In the unstressed condition of the dynamometer, the positions of the contacts are such that the potentials taken therefrom are zero. The voltmeters schematically indicated in Fig. 1 have a center zero reading. Their deflection in one or the other direction corresponds in direction and magnitude to the deflection of the corresponding arm 18 and consequently to the magnitude and direction of the stress applied to the grip 5, or more exactly to the components of that stress parallel to axis $R_1$ or $R_2$ along which the dynamometer resolves the applied stress.

The frame 1 and plate 4 are advantageously made of a light-weight metal. The tube 7 and the rods 14 and 15 are preferably made of steel with polished surfaces to minimize friction between them. The springs 2 should be made of spring steel and should have in their central portions a smaller diameter than the end portions thereof employed for fastening in frame 1 and plate 4, as indicated in Fig. 3.

Of course the springs 2 must be so disposed as to position the frame 1 and plate 4 exactly parallel to each other. In order to provide self-centering of the springs with respect to holes in frame 1 and plate 4 the conical nuts 30 are according to the invention provided with two sets of slits spaced at 90° from each other. With this arrangement, upon the tightening of the nuts, they will automatically center themselves with respect to springs 2.

The coil springs 16 embody a further feature of the invention. These springs not only stress the rods 14 and 15 against the tube 7 but provide electrical leads to the slider contacts 19. In order to insure electrical continuity through these leads, springs 16 are threaded through a succession of suitably disposed holes in plates 24 and 25 and may be soldered thereto. Since in this fashion plural coils of the springs are brought into contact with the plates 24 and 25, good electrical contact is insured. This precaution further insures that the springs will be stressed only parallel to their own axes, thus preventing errors in measurement due to faulty stressing of these springs. The plates 24 (Fig. 3) are supported in insulated relation from the frame 1 and conductors of cables 22 and 23 connecting therewith are led out through the apertures between frame 1 and its extension column 1'.

The plural axis dynamometer of the invention makes it possible for the cylindrical housing 26 to be very simply applied to the dynamometer from beneath, the housing being fastened to frame 1 by means of screws 27. For servicing of the dynamometer, it is necessary only to withdraw the housing in order to expose all components.

According to the invention, a seal of the housing 26 and plate 4 is very simply provided. Since the plate 4 must be free of all accidental and undesired stresses which might falsify the readings, there is according to the invention provided as sealing element a rubber ring 29 which is hollow and inflated with air. In this way the ring presents to the housing 26 an elastic counterstress, within the elastic limit of the rubber ring. The deformation of the sealing ring consequently adds linearly to the measured result and hence does not falsify the latter.

According to a further feature of the invention, the elements of the dynamometer are so constructed and arranged according to the building block principle that the dynamometer can very simply be modified to give measurements about three instead of two axes. With this modification it is possible to transform stresses applied to the grip in the third dimension, i. e. transverse to the plate of arrows $R_1$ and $R_2$ in Fig. 1, into electrical control signals corresponding to the magnitude of such stresses. For the provision of a third dynamometer element for measurement about the third axis the dynamometer is constructed with a hollow interior portion so that a stress coupling member 28 can be led through the device as illustrated in Fig. 2. The rod 28 is fastened to the hand grip 5a and passes through the center of the entire assembly including the hollow tube 7, frame extension column 1' and through apertures in frame 1 and plate 4. To the lower end of the rod 28 there is fastened a ring dynamometer for the measurement of tensile and compressive stresses. A suitable dynamometer for this purpose is disclosed in my copending application entitled "Dynamometer," Serial No. 576,197, filed April 4, 1956, assigned to the assignee hereof.

Upon the application of an upward or downward force to the grip 5a, a compression or tensile stress is transmitted by rod 28 to the ring dynamometer to compress or stretch the latter. This compression or stretching increases or diminishes the spacing of studs at the ends of the ring dynamometer and between which the compressive or tensile stress is to be measured. This alteration in spacing of the studs is proportional to the applied tensile or compressive stress. If therefore there is applied to the grip 5a a stress having a component perpendicular to the plane of arrows $R_1$, $R_2$ (Fig. 1) and also a component in that plane, this stress will be resolved by the two-axis dynamometer in its components in that plane and by the ring dynamometer into the component perpendicular to that plane. The components of the stress thus mechanically resolved are transferred according to the invention into control voltages which are similarly associable in direction and magnitude with the components in question. With such a plural axis dynamometer it is therefore possible to develop from a single hand grip control signals which in magnitude and polarity are proportional to the stress applied to the hand grip. As applied, for example, to control of a derrick, such a hand grip permits control of all motions and velocities of the cable.

Other control elements appropriate to the intended use of the dynamometer may be disposed within the hand grip. For example, it is possible to incorporate in the hand grip a so-called dead man's button. It is also possible to modify the stress-strain characteristic of the dynamometer of the invention, for example by giving unequal cross-sections to the separate springs 2. If, for example, the section of one spring is elliptical and that of the other circular, the moments of inertia of the springs will be unequal and this will modify the stress-strain characteristic of all springs. For a circular section of the springs, all of their stress-strain characteristics are equal. Hence for all directions (in the $R_1$, $R_2$ plane) the same stress will produce the same strain. The disparity among moment of inertia characteristics can also be used to give to the dynamometer a specified stress-strain characteristic in a selected direction.

While the invention has been described herein in terms of a preferred embodiment, various changes may be made within the scope of the appended claims. It will moreover be understood that so far as concerns the analysis and measurement of applied stresses the base and stress-receiving members of the dynamometer are interchangeable in position and function, the dynamometer of the invention being effective to analyze into components a stress applied between such base and member regardless which of the two is considered to be stationary and the other movable with respect thereto in response to a stress applied between the two.

I claim:

1. A dynamometer comprising a base frame, a plurality of springs, a stress-receiving member secured by said springs to said frame, two rods journaled in said frame for rotation about perpendicular axes each parallel to and laterally displaced from the one of said rods journaled for rotation thereabout, separate means coupling said rods with said member for motions of said member perpendicular to the length of said rods respectively, potentiometer windings arranged in said frame transversely of said axes, and a slide contact coupled to each of said rods for engagement one with each of said windings.

2. A dynamometer comprising a base frame, a stress-receiving member, a plurality of cantilever-type springs of equal length affixed at one end to said frame parallel to each other and at the other end to said member, two cranks journaled in said frame for rotation about axes perpendicular to said springs and to each other, separate means coupling said cranks with said member for motions of said member transverse of said axes respectively, a sliding electrical contact arranged on each of said cranks, electrical resistances arranged on said base in position to be engaged each by one of said contacts at successive points along said resistances respectively upon rotation of said cranks, and electrically conducting means coupled to each of said contacts.

3. A dynamometer comprising a base frame, a hollow central column affixed to said frame, a plurality of cantilever-type springs secured to said frame in parallel relation, a stress-receiving member secured to the free ends of said springs, a tube affixed to said member in spaced telescoping relation with said column, two cranks journaled in said column for rotation about axes perpendicular to each other and to the length of said springs, the pins of said cranks extending within said column transversely thereof, resilient means engaged between said column and cranks stressing said crank pins against said tube, and separate means coupled one to each of said cranks for the generation of a variable electrical signal upon rotation of said cranks respectively.

4. A dynamometer comprising a frame having a base portion, a hollow central column affixed to said frame, a plurality of cantilever-type springs of equal length affixed to said frame at the angles of a polygon surrounding said column to extend substantially parallel from said base portion, a stress-receiving member affixed to the free ends of said springs, a cylindrical tube affixed to said member in spaced telescoping relation with said column and extending parallel to the length of said springs, two cranks journaled in said column for rotation about axes perpendicular to said springs and to each other, said cranks having crank pins extending across the interior of said column, resilient means coupled between said cranks and frame stressing said crank pins against said tube, the pin and shaft of each of said cranks lying for an unstressed condition of the dynamometer in a plane substantially parallel to the length of said springs, an electrical contact affixed to each of said cranks, and two electrical resistance windings arranged in said base in position each to be engaged by one of said contacts.

5. A dynamometer comprising a frame having a base portion, a hollow central column affixed to said frame, a plurality of cantilever-type springs of equal length affixed to said frame at the angles of a polygon surrounding said column to extend substantially parallel from said base portion, a stress-receiving member affixed to the free ends of said springs, a cylindrical tube affixed to said member in spaced telescoping relation with said column and extending parallel to the length of said springs, two cranks journaled in said column for rotation about axes perpendicular to said springs and to each other, said cranks having crank pins extending across the interior of said column, resilient means coupled between said cranks and frame stressing said crank pins against said tube, the pin and shaft of each of said cranks lying for an unstressed condition of the dynamometer in a plane substantially parallel to the length of said springs, two electrical contacts affixed to each of said cranks, and four electrical resistance windings arranged on said frame in pairs for engagement by said contacts upon rotation of said cranks, opposite ends of the two windings of each pair of resistance windings being electrically connected together.

6. A dynamometer comprising a frame having a base portion, a hollow central column affixed to said frame, four cantilever-type springs of equal length affixed to said frame at the angles of a rectangle surrounding said column to extend substantially parallel from said base portion, a stress-receiving member affixed to the free ends of said springs, a cylindrical tube affixed to said member to extend therefrom substantially parallel to said springs in spaced telescoping relation with said column, stops arranged on the interior of said column extending with clearance into recesses in said tube, two pairs of rigidly coupled levers pivoted in said column for rotation about axes perpendicular to the length of said springs and to each other, a rod affixed to each pair of levers parallel to the axis of rotation of its pair in position to contact said tube for an unstressed condition of the dynamometer when the plane defined by such pin and its axis of rotation is parallel to the length of said springs, a coil spring coupled between each of said levers and column, said coil springs being electrically insulated from each other, an electrical slider contact arranged on each of said levers and electrically connected to one of said coil springs, and four electrical resistance windings arranged on said frame in pairs for engagement by said contacts upon rotation of said pairs of levers, opposite ends of the two windings of each pair of resistance windings being electrically connected together.

References Cited in the file of this patent

UNITED STATES PATENTS

| | | |
|---|---|---|
| 2,505,070 | Shaw | Apr. 25, 1950 |
| 2,544,738 | Tint | Mar. 13, 1951 |

FOREIGN PATENTS

| | | |
|---|---|---|
| 695,037 | Germany | Aug. 14, 1940 |

OTHER REFERENCES

Publication: "Stick-force Indicator for Aircraft," page 1448 of Instruments, vol. 24.